No. 617,776.  
A. SCHEUERER, Jr.  
BELT FASTENER.  
(Application filed May 20, 1897.)
Patented Jan. 17, 1899.
(No Model.)
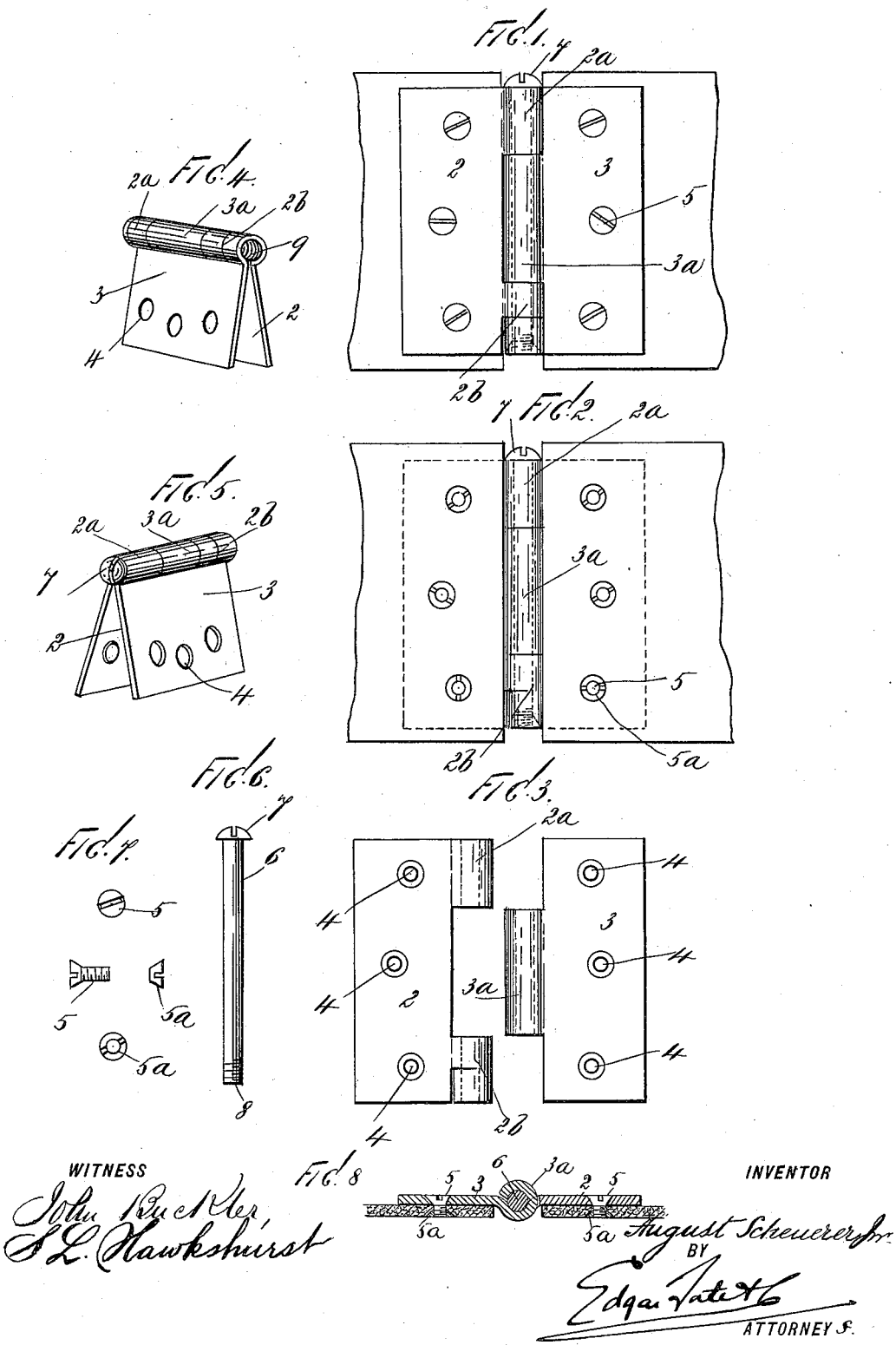

UNITED STATES PATENT OFFICE.

AUGUST SCHEUERER, JR., OF PHILADELPHIA, PENNSYLVANIA.

BELT-FASTENER.

SPECIFICATION forming part of Letters Patent No. 617,776, dated January 17, 1899.

Application filed May 20, 1897. Serial No. 637,480. (No model.)

*To all whom it may concern:*

Be it known that I, AUGUST SCHEUERER, Jr., a citizen of the United States, residing at Philadelphia, in the county of Philadelphia and State of Pennsylvania, have invented a new and useful device and manner of application of said device to be used in making a new and novel belt-joint, of which the following is a specification.

My invention relates to a device for connecting the ends of power-belts, and has for its object the production of a device of this character which may be applied to the ends of belts without interfering in any way with the perfect operation of the belt and at the same time insuring a joint which will not be subject to breakage, while being capable of application to the ends of belts to join them with a reduced amount of labor.

A further object of the invention is to provide a device of the above-described class that will be simple in construction, efficient in operation, and comparatively inexpensive to manufacture.

The invention consists in those novel features of construction hereinafter set forth and described, and more particularly pointed out in the claim hereto appended.

In the drawings which form a part of this specification, Figure 1 is a top view of a belt with the ends joined by means of my improved attachment. Fig. 2 is a running side of said belt. Fig. 3 is a view of my attachment disconnected at the bearing-point. Fig. 4 is a view of the attachment on two ends of the side plates, showing the sides thereof which rest on the belt. Fig. 5 is a similar view in the reverse position. Fig. 6 is a view of the connecting-pin. Fig. 7 are views of bolts and nipples for connecting my attachment with the belt, and Fig. 8 is a sectional elevation of the ends of the belt and my improved attachment applied thereto.

Like numerals of reference refer to like parts throughout the several views.

Referring to the drawings, I have shown at 2 a metal plate provided with bearings $2^a$ and $2^b$ on one edge thereof, situated at a predetermined distance apart, by means of which the plate 2 is connected with a second plate 3, having a bearing $3^a$, adapted to pass between the bearings $2^a$ and $2^b$, the openings in said bearings being adapted to aline with each other to form a continuous channel for the reception of a pin or pintle, whereby said parts may be united. The bearings $2^a$ and $2^b$ are preferably integrally attached to the plate 2 at approximately their central point, so that said bearing partially extends between the belt ends, so as not to present outwardly-abutting surfaces which might work injury to persons employed about the machinery. The bearing $3^a$ is similarly arranged on the plate 3, so that the plates 2 and 3 will be approximately on the same horizontal plane. This construction will admit of the turning of the fastener in the positions shown in Figs. 4 and 5, the belt under no circumstances being permitted to close entirely in either direction.

The plates 2 and 3 are secured together by means of a bolt 6 passing through the opening in the bearings $2^a$ and $3^a$ and $2^b$, said bolt being provided with a slotted rounded head 7 and screw-thread 8 on the opposite extremity thereof. The bolt is secured in its relation to said plates by means of a screw-thread 9 on the interior of the lower extremity of the bearing $2^a$, which is formed therein by contracting said portion and tapping in the ordinary manner. Each of said plates 2 and 3 is provided with a plurality of openings 4, which preferably present an outwardly and an annular beveled surface, by means of which they may be attached to the belt through the agency of screw-threaded bolts 5, the heads of which are adapted to be countersunk in said plate by means of said openings, and nipples $5^a$, shaped like the frustum of a cone, adapted to be secured on the opposite side of the belt, which is provided with an opening adapted to form a seat for said nipple. The nipple $5^a$ and bolt 5 are each provided with head-slots in order to admit of being secured in position by means of a screw-driver or other similar device.

My device is applied to the belts by separating the plates, as shown in Fig. 3, and attaching them to the opposite ends of a belt by punching beveled holes in said belt and inserting the bolt 5 through the opening 4 in each plate and the opening formed in the belt and securing them in this position by means of the nipple $5^a$. The ends of the belt are then brought together and the bearings 3ª inserted between the bearings 2ª and 2ᵇ and the bolt 7 passed through said parts and secured in that position by means of the thread 8 therein and through screw-thread 9 in the bearing 2ᵇ.

The ends of the belt with my improvement applied thereto will be attached in a manner more efficient than the ordinary lacing would make it, as the joint formed between the ends of said belt will practically be as strong as if not stronger than any other portion of the belt. The hinge effect will permit the belt to pass freely over the pulley, the bearings being in such relation with the belting as not to abrade the pulley in any way, while not protruding sufficiently to injure a person inadvertently touching the belt. It will be observed that the plates 2 and 3 are attached to one end of the belt only, so that an extended metal surface at no time comes in contact with the pulley-block, and as the nipples are countersunk in the belting the danger of injury to the face of the pulley is reduced to a minimum.

The formation of the nipple increases to a great extent the efficiency of the joint as above formed and provides an efficient means of connection which may be readily applied to a belt.

By the means above described I have attained the object of my invention, having produced a device whereby the ends of power-belts may be expeditiously united that is simple in construction, efficient in operation, and comparatively inexpensive to manufacture.

I do not intend to limit the invention to the precise construction herein shown and described, as it is obvious that there may be many various changes in minor details of construction without departing from the spirit and scope of the invention.

Having described my invention, what I claim, and desire to secure by Letters Patent, is—

In a device for joining the ends of a belt, two plates, each of which is provided along one end with cylindrical, tubular bearings, which interfit, one of the end bearings of one plate being partially divided and its outer section contracted, said outer contracted section being screw-threaded internally, and a pintle extending through said bearings and having a screw-threaded end engaging the screw-threaded portion of said end bearing.

AUGUST SCHEUERER, Jr.

Witnesses:
FRANK E. ENGELMAN,
EDWARD M. LEE.